United States Patent
Kasprzyk et al.

(10) Patent No.: US 11,668,367 B2
(45) Date of Patent: Jun. 6, 2023

(54) HYDRAULIC DAMPER ASSEMBLY INCLUDING A HYDRAULIC COMPRESSION STOP

(71) Applicant: BeijingWest Industries Co., Ltd, Beijing (CN)

(72) Inventors: Dominik Jaroslaw Kasprzyk, Debica (PL); Waldemar Jaroslaw Ryndak, Rzepiennik Strzyzewski (PL)

(73) Assignee: BEIJINGWEST INDUSTRIES CO., LTD, Beijing (CN)

( * ) Notice: Subject to any disclaimer, the term of this patent is extended or adjusted under 35 U.S.C. 154(b) by 69 days.

(21) Appl. No.: 17/333,011

(22) Filed: May 28, 2021

(65) Prior Publication Data
US 2021/0404528 A1    Dec. 30, 2021

(30) Foreign Application Priority Data

Jun. 24, 2020   (CN) .......................... 202010584792.7

(51) Int. Cl.
*F16F 9/49*    (2006.01)
*F16F 9/18*    (2006.01)
(Continued)

(52) U.S. Cl.
CPC ............... *F16F 9/49* (2013.01); *F16F 9/185* (2013.01); *F16F 9/3271* (2013.01);
(Continued)

(58) Field of Classification Search
CPC .. F16F 9/49; F16F 9/185; F16F 9/3271; F16F 9/3465; F16F 2226/045; F16F 2228/001; F16F 2234/02
See application file for complete search history.

(56) References Cited

U.S. PATENT DOCUMENTS

| 3,447,644 A | * | 6/1969 | Duckett | .................... F16F 9/48 |
| | | | | 188/315 |
| 5,577,579 A | * | 11/1996 | Derr | ........................ F16F 9/325 |
| | | | | 188/315 |

(Continued)

FOREIGN PATENT DOCUMENTS

| CN | 102865327 A | 1/2013 |
| CN | 103706666 A | 4/2014 |

(Continued)

OTHER PUBLICATIONS

First Office Action and search report dated Jul. 1, 2021 for counterpart Chinese patent application No. 202010584792.7, along with machine EN translation downloaded from EPO.

(Continued)

*Primary Examiner* — Robert A. Siconolfi
*Assistant Examiner* — James K Hsiao
(74) *Attorney, Agent, or Firm* — William H. Honaker; Dickinson Wright PLLC (57) ABSTRACT

A hydraulic damper assembly comprises a main tube defining a fluid chamber. An external tube extends about the main tube defining a compensation chamber between the main and external tubes. A main piston, located in the main tube, divides the fluid chamber into a compression chamber and a rebound chamber. A piston rod couples to the main piston. A base valve, located in the compression chamber, couples to the main tube. A hydraulic compression stop, located in the compression chamber, includes an additional piston, an insert, and a fixing member. The additional piston couples to the main piston. The insert, located in the compression chamber, couples to the base valve. The insert has a main section and a terminal section. The terminal section having an external diameter that is less than an external diameter of the main section.

15 Claims, 5 Drawing Sheets

(51) Int. Cl.
*F16F 9/32* (2006.01)
*F16F 9/346* (2006.01)

(52) U.S. Cl.
CPC ...... *F16F 9/3465* (2013.01); *F16F 2226/045* (2013.01); *F16F 2228/001* (2013.01); *F16F 2234/02* (2013.01)

(56) References Cited

U.S. PATENT DOCUMENTS

| | | | | |
|---|---|---|---|---|
| 7,628,257 | B1* | 12/2009 | Lu | F16F 9/3415 |
| | | | | 188/282.5 |
| 8,025,135 | B1* | 9/2011 | Lu | F16F 9/585 |
| | | | | 188/282.5 |
| 8,127,901 | B1* | 3/2012 | Lu | F16F 9/585 |
| | | | | 188/282.5 |
| 8,162,112 | B2* | 4/2012 | Gartner | F16F 9/49 |
| | | | | 188/289 |
| 8,752,682 | B2* | 6/2014 | Park | F16F 9/3481 |
| | | | | 188/322.22 |
| 9,593,697 | B2 | 3/2017 | Baalmann et al. | |
| 9,605,726 | B2* | 3/2017 | Baldoni | F16F 9/49 |
| 9,657,803 | B2* | 5/2017 | Slusarczyk | B21D 22/20 |
| 9,695,900 | B2* | 7/2017 | Roessle | F16F 9/18 |
| 9,702,176 | B2* | 7/2017 | Janak | E05F 1/105 |
| 9,822,837 | B2* | 11/2017 | Groves | B60G 13/08 |
| 9,909,638 | B2* | 3/2018 | Chyla | F16F 9/36 |
| 10,527,122 | B2* | 1/2020 | Kus | F16F 9/49 |
| 10,557,513 | B2* | 2/2020 | Pecar | F16F 9/363 |
| 10,670,107 | B2* | 6/2020 | Flacht | F16F 9/3465 |
| 10,876,591 | B2* | 12/2020 | Mallin | F16F 9/5126 |
| 11,181,161 | B2* | 11/2021 | Baldoni | F16F 9/19 |
| 11,187,298 | B2* | 11/2021 | Mallin | F16F 9/49 |
| 11,306,798 | B2* | 4/2022 | Cox | F16F 9/3214 |
| 2004/0231934 | A1* | 11/2004 | Heo | F16F 9/48 |
| | | | | 188/284 |
| 2008/0053765 | A1* | 3/2008 | Tomonaga | B62K 25/08 |
| | | | | 188/315 |
| 2009/0056405 | A1 | 3/2009 | Uan et al. | |
| 2012/0061194 | A1 | 3/2012 | Yu | |
| 2014/0360353 | A1* | 12/2014 | Baalmann | F16F 9/49 |
| | | | | 92/143 |
| 2016/0091046 | A1* | 3/2016 | Soromenho | B60G 13/08 |
| | | | | 188/297 |
| 2016/0230835 | A1 | 8/2016 | Groves et al. | |
| 2017/0328438 | A1* | 11/2017 | Osika | F16F 9/3214 |
| 2018/0119770 | A1 | 5/2018 | Bruno et al. | |
| 2018/0223942 | A1* | 8/2018 | Kus | F16F 9/3465 |
| 2019/0154103 | A1* | 5/2019 | Groul | B60G 17/08 |
| 2019/0322151 | A1* | 10/2019 | Kasprzyk | F16F 9/3235 |
| 2019/0353221 | A1 | 11/2019 | Hertz et al. | |
| 2020/0256420 | A1* | 8/2020 | Mallin | F16F 9/49 |
| 2021/0131519 | A1* | 5/2021 | Mallin | F16F 9/185 |

FOREIGN PATENT DOCUMENTS

| | | |
|---|---|---|
| CN | 108253073 A | 7/2018 |
| CN | 108757811 A | 11/2018 |
| DE | 102004008956 A1 | 9/2005 |
| DE | 102014223480 A1 | 5/2016 |
| EP | 3239556 A1 | 11/2017 |
| EP | 3358213 B1 | 11/2018 |
| FR | 3004501 A1 | 10/2014 |
| GB | 2050561 A1 | 1/1981 |
| JP | 2016003675 A | 1/2016 |
| JP | 6377972 B2 | 8/2018 |
| WO | 2018224961 A1 | 12/2013 |
| WO | 2019167006 A1 | 9/2019 |

OTHER PUBLICATIONS

Extended European Search Report dated Dec. 3, 2021 for counterpart European patent application No. 21179993.7.

* cited by examiner

HYDRAULIC DAMPER ASSEMBLY INCLUDING A HYDRAULIC COMPRESSION STOP

CROSS-REFERENCE TO RELATED APPLICATIONS

This application claims priority to Chinese Patent Application No. 202010584792.7, filed on Jun. 24, 2020, which is hereby incorporated by reference in its entirety.

BACKGROUND OF THE INVENTION

1. Field of the Invention

The present invention relates generally to a hydraulic damper assembly for a vehicle.

2. Description of the Prior Art

Hydraulic damper assemblies including a hydraulic compression stop ("HCS") are known in the art for generating an additional damping force over a predefined section of the piston rod travel during compression stroke. One such a hydraulic damper assembly is disclosed in PCT patent publication WO2019167006.

In known solutions, the insert of the HCS can be press fitted onto a fixing member by pressing a simple tubular end section of the insert having a constant wall thickness onto a head portion of the fixing member. In order to obtain the required leakproofness for the press fit connection, it is necessary to implement a relatively high degree of interference (tightness) of the connection which can damage of the head portion during a press-fitting process. Furthermore the presence of an insert inside the compression chamber can affect the flow of a working liquid through the compression chamber.

SUMMARY OF THE INVENTION

The present invention provides a hydraulic damper assembly that minimizes the effect of a HCS on the flow of the working liquid through a compression chamber of the hydraulic damper assembly. The present invention also provides a hydraulic damper assembly including the HCS having an improved press fit connection between an insert and a head portion thereby generating minimal restrictions for the flow of working liquid through the base valve.

It is one aspect of the present invention to provide a hydraulic damper assembly. The hydraulic damper assembly comprises a main tube extending along a center axis defining a fluid chamber for containing a working fluid. An external tube extends about the main tube defining a compensation chamber extending between the main tube and the external tube. A main piston is located in the main tube dividing the fluid chamber into a compression chamber and a rebound chamber. A piston rod extends into the main tube and coupled to the main piston for moving the main piston between a compression stroke and a rebound stroke. A base valve is located in the compression chamber and coupled to the main tube for controlling working fluid flow between the compression chamber and the compensation chamber. A hydraulic compression stop is located in the compression chamber for providing an additional damping force during the compression stroke. The hydraulic compression stop includes an additional piston and an insert. The additional piston couples to the main piston for movement with the main piston between the compression stroke and the rebound stroke. The insert, located in the compression chamber, couples to the base valve. The insert has a main section and a terminal section. The terminal section is located adjacent to the fixing member. The main section is in fluid communication with the terminal section. The terminal section has an external diameter that is less than an external diameter of the main section.

It is another aspect of the present invention to provide a hydraulic damper assembly. The hydraulic damper assembly comprises a main tube extending along a center axis defining a fluid chamber for containing a working fluid. An external tube extending about the main tube defining a compensation chamber extending between the main tube and the external tube. A main piston is located in the main tube dividing the fluid chamber into a compression chamber and a rebound chamber. A piston rod extends into the main tube and coupled to the main piston for moving the main piston between a compression stroke and a rebound stroke. A base valve located in the compression chamber and coupled to the main tube for controlling working fluid flow between the compression chamber and the compensation chamber. A hydraulic compression stop is located in the compression chamber for providing an additional damping force during the compression stroke. The hydraulic compression stop includes an additional piston, an insert, and a fixing member. The additional piston couples to the main piston for movement with the main piston between the compression stroke and the rebound stroke. The fixing member is located between the main tube and the base valve for coupling the base valve to the main tube. The insert is located in the compression chamber coupled to the fixing member. The fixing member includes a head portion extending outwardly from the fixing member and along the center axis toward the main piston. The terminal section of the insert including an internal flange extending radially inwardly toward the center axis. The internal flange defines a mounting opening for receiving the head portion to establish a press-fit engagement.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
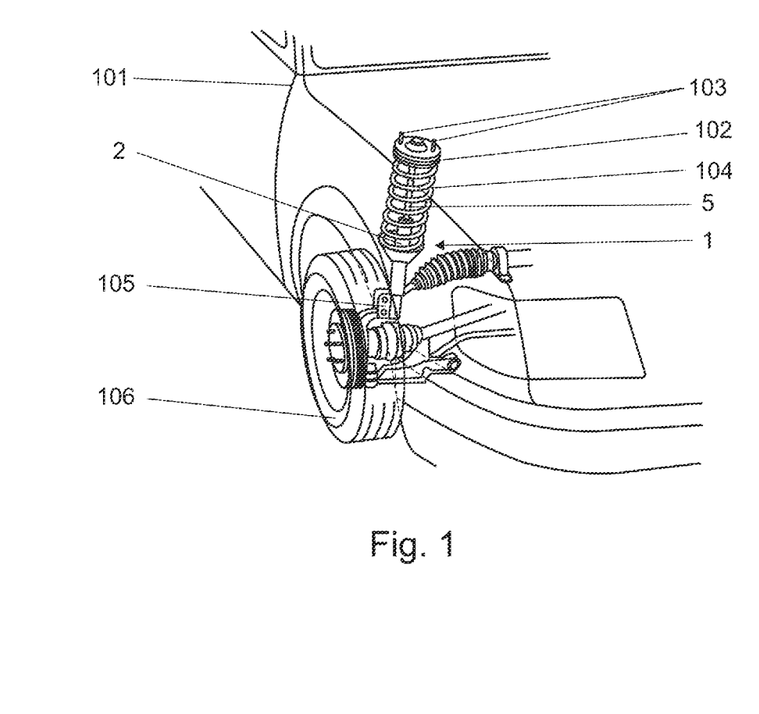
FIG. 1 is a fragmentary view of a vehicle including a hydraulic damper assembly constructed in accordance with an embodiment of the present invention.

Referring to the Figures, wherein like numerals indicate corresponding parts throughout the several views, FIG. 1 illustrates a hydraulic damper assembly 1 constructed in accordance with an embodiment of the present invention coupled to a vehicle chassis 101. The hydraulic damper assembly 1 can be coupled to the vehicle chassis 101 using a top mount 102 and a plurality of screws 103 wherein the plurality of screws 103 are disposed along a periphery of an upper surface of the top mount 102. The top mount 102 couples to a coil spring 104 and a piston rod 5 of the hydraulic damper assembly 1. An external tube 2 of the hydraulic damper assembly 1 can be coupled to a steering knuckle 105 supporting the vehicle wheel 106.

Figure 2:
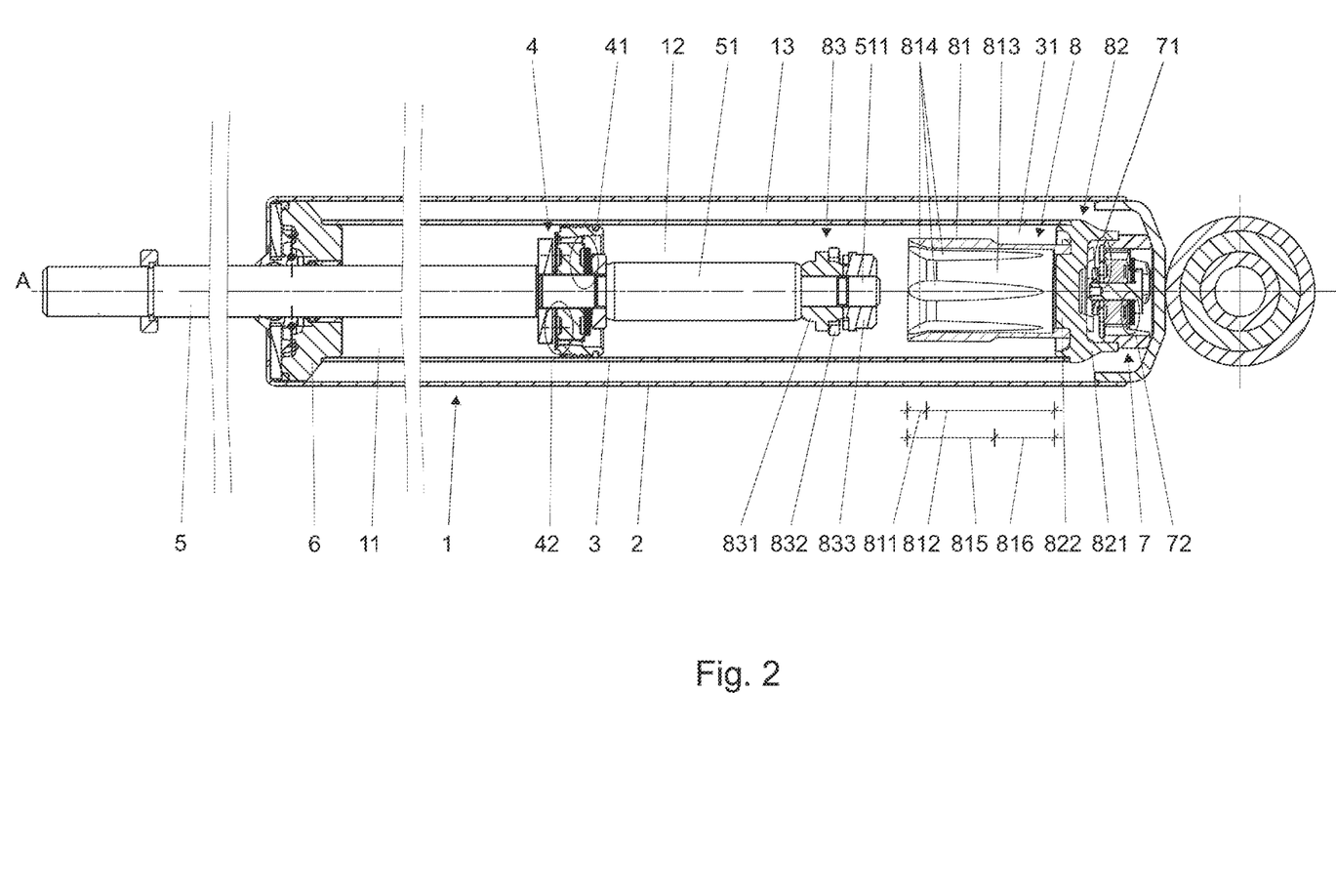
FIG. 2 is a cross-sectional view of a hydraulic damper assembly constructed in accordance with an embodiment of the present invention.

FIG. 2 illustrates a twin-tube damper 1, also referred to as a hydraulic damper assembly 1, constructed in accordance with an embodiment of the present invention. The hydraulic damper assembly 1 comprises an external tube 2 and a main tube 3. The main tube 3 extends along a center axis A and defines a fluid chamber 11, 12 for containing a viscous working fluid. The external tube 2, radially spaced apart from the main tube 3, extends along the main tube and defines a compensation chamber 13 extending between the main tube 3 and the external tube 2. A main piston 4 located in the main tube 3 divides the fluid chamber 11, 12 into a compression chamber 12 and a rebound chamber 11. A piston rod 5 extends into the main tube 3 through a piston rod guide 6. The piston rod guide 6 couples to one end of the main tube 3 wherein one end of the piston rod 5, located in the fluid chamber 11, 12, couples to the main piston 4 and another end of the piston rod 5 extends outside of the hydraulic damper assembly 1. The piston rod 5 moves the main piston 4 between a compression stroke and a rebound stroke. During the compression stroke, the piston rod 5 and the main piston 4 move axially in the fluid chamber 11, 12 away from the piston rode guide 6. During the rebound stroke, the piston rod 5 and the main piston 4 move axially in the fluid chamber 11, 12 toward from the piston rode guide 6.

The hydraulic damper assembly 1 includes a base valve 7 coupled at another end of the main tube 3. The main piston 4 makes a sliding fit with an inner surface of the main tube 3 dividing the fluid chamber 11, 12 of the main tube 3 into the rebound chamber 11 and the compression chamber 12. The rebound chamber 11 extends between the main piston 4 and the piston rod guide 6. The compression chamber 12 extends between the main piston 4 and the base valve 7 wherein the base valve 7 restricts working fluid flow between the compression chamber 12 and the compensation chamber 13.

According to an embodiment of the present invention, the main piston 4 can be provided with rebound and compression valves 41, 42. The rebound and compression valves 41, 42 can include stacks of deflectable or floating discs, optionally biased by springs, for controlling the flow of working fluid through the main piston 4 between the rebound chamber 11 and the compression chamber 12 in response to an axial movement of the main piston 4 along the center axis A. Additionally, the base valve 7 can be provided with rebound and compression valves 71, 72 for controlling the flow of working fluid passing between the additional compensation chamber 13 and the compression chamber 12, respectively, during rebound and compression stroke of the hydraulic damper assembly 1. It should be appreciated that, the valves 41, 42 and 71, 72 can provide design parameters that may be used to shape desired passive characteristic of the hydraulic damper assembly 1.

Figure 3:
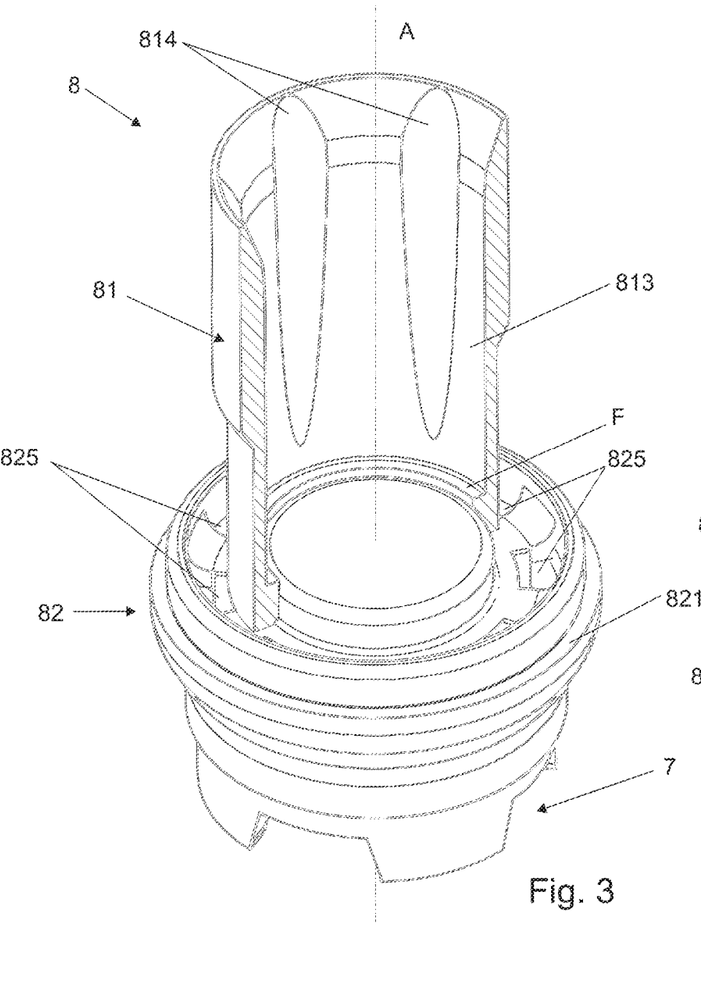
FIG. 3 is a perspective view of a base valve with a cross-sectional perspective view of an insert press fitted onto a fixing member of a hydraulic compression stop.
Figure 4:
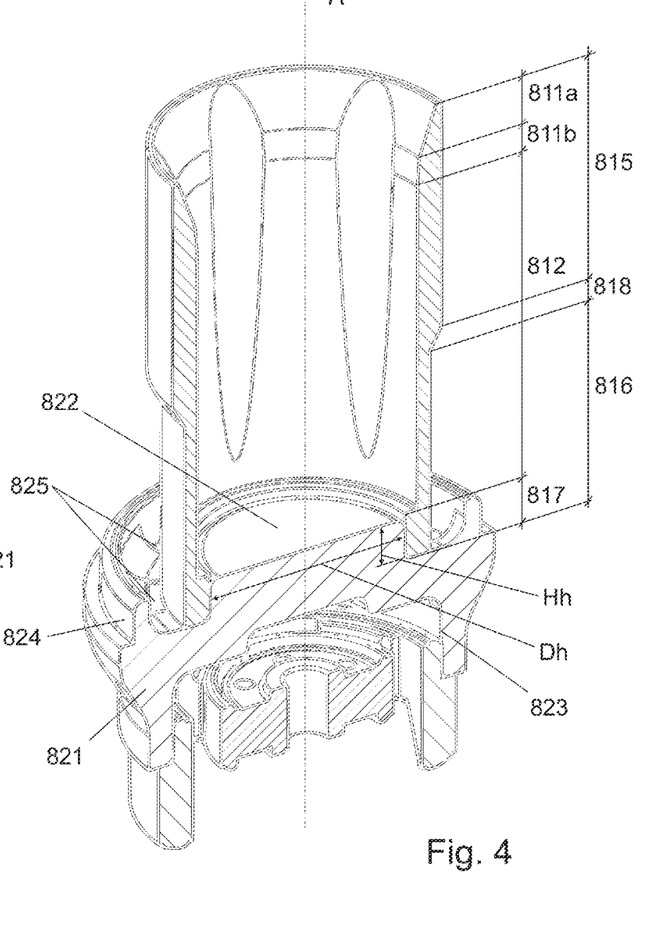
FIG. 4 is a perspective view of the base valve including the insert press fitted onto the fixing member of the hydraulic compression stop.

The hydraulic damper assembly 1 includes a hydraulic compression stop 8 located in the compression chamber for providing an additional damping force at the end of the compression stroke to avoid abrupt stop of the main piston 4. The hydraulic compression stop 8, as best shown in FIGS. 3-5, includes an insert 81, a fixing member 82 and an additional piston 83.

Figure 5:
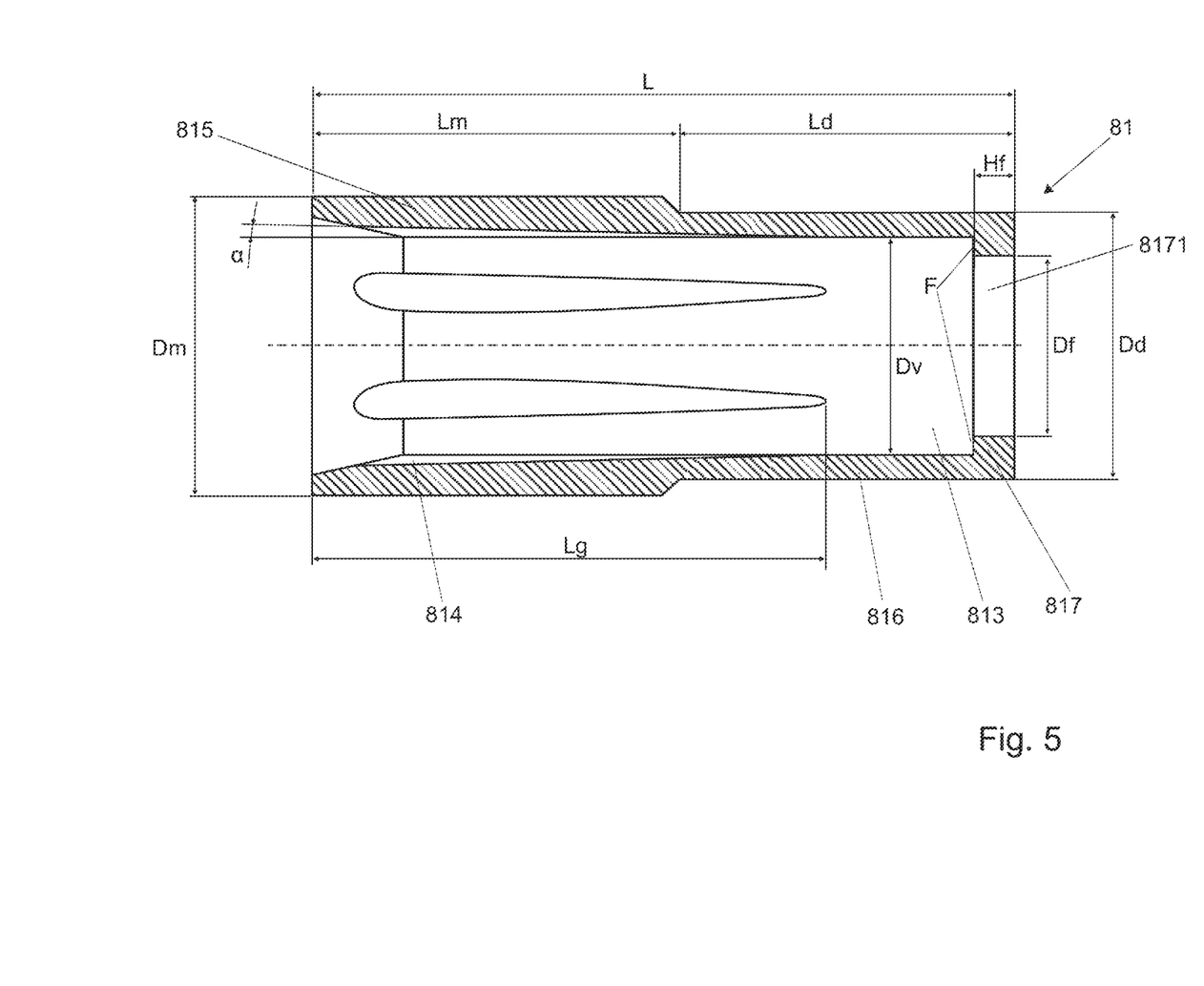
FIG. 5 is cross-sectional view of the insert constructed according to an embodiment of the present invention.

As best shown in FIG. 5, the insert 81 has a generally tubular shape and defines an inner chamber 813 extending along the center axis A. The inner chamber 813 is in fluid communication with the compression chamber 12 for receiving the additional piston 83 during the compression stroke. The inner chamber 813 extends between an entry point and an end point. Near the entry point of the inner chamber 813, an inner surface of the insert 81 defines a plurality of grooves 814 extending along the inner surface of the insert 81 toward the end point. According to an embodiment of the present invention, the plurality of grooves 814 include six grooves, equiangularly located about the center axis and spaced apart from one another for allowing the working liquid to exit the inner chamber 813 during the compression stroke. As the grooves 814 extend along the center axis A, the depth of the grooves 814 also diminishes. Accordingly, as the depth of the grooves 814 diminishes, the damping force increases. In a cross-sectional view, the inner surface of the insert 81 has a conical section 811 near the entry point followed by a cylindrical section 812. According to an embodiment of the present invention, the conical section 811 can include two conical subsections 811$a$, 811$b$ having different inclination angles. It should be appreciated that the conical section 811 facilitates and guides the additional piston 83 into the inner chamber 813. Additionally, it should be appreciated that this shaping along with the grooves 814 provide smooth built-up of the damping force.

According to an embodiment of the present invention, the insert 81 has external diameters Dm, Dd which is less than an internal diameter of the main tube 3. Accordingly, the insert 81 and the main tube 3 define an axial annular channel located between an external surface of the insert 81 and an internal surface of the main tube 3. The axial annular channel 31 allows the working liquid to flow around the insert 81 between the compression chamber 12 and the compensation chamber 13 through the base valve 7 during the compression and rebound strokes.

According to an embodiment of the present invention, an internal diameter Dv of the inner chamber 813 can be constant along approximately an entire length L of the inner chamber 813 aside from the conical section 811. At the conical section 811, the internal diameter gradually increases toward the entry point of the inner chamber 813.

According to an embodiment of the present invention, the insert 81 can include a main section 815 and a terminal section 816. The terminal section 816 is located adjacent to the base valve 7. The main section 815 is in fluid communication with the terminal section 816. The main section has an external diameter Dm and a length Lm extending from the entry point of the inner chamber 813. The terminal section 816 has an external diameter Dd extending from an end point of the inner chamber 813 wherein the external diameter Dd of the terminal section 816 is less than the external diameter Dm of the main section 815.

The fixing member 82 is located between the main tube 3 and the base valve 7 for coupling the base valve 7 to the main tube 3. According to an embodiment of the present invention, the fixing member 82 can be made from sintered steel and can have a tensile strength (Rm) greater than or equal to 300 Mpa, a yield strength (Re) of greater than or equal to 250 Mpa, and hardness amounting at least 51 HRB in Rockwell B scale. The fixing member 82 can include a cylindrical body 821. A head portion 822 extends outwardly from the fixing member 82 and along the center axis A toward the main piston 4. The fixing member 82 defines a cavity located in the compensation chamber 13 and in fluid communication with the compensation chamber 13. The cavity presents an internal cylindrical surface 823 for receiving the base valve 7 wherein the base valve 7 is coupled to the fixing member 82 by being press fitted against the internal cylindrical surface 823. The cylindrical body 821 has an external cylindrical surface 824 extending about the cylindrical body 821 apt to be press fitted against the main tube 3 to secure the fixing member 82 to the main tube 3. The fixing member 82 defines a plurality of axial channels 825 extending through the fixing member 82 enabling a fluid communication between the compression chamber 12 and the compensation chamber 13 through the base valve 7 during the compression stroke and the rebound stroke. According to an embodiment of the present invention, the plurality of axial channels 825 includes eight axial channels 825 equiangularly spaced from one another about the center axis A and extending through the fixing member 82.

At the end point of the inner chamber 813, the insert 81 includes an internal flange 817 extending radially inwardly toward the center axis A. The internal flange 817 defines a mounting opening 8171 wherein the insert 81 is sealingly press fitted against the head portion 822 of the fixing member 82, e.g. the insert 81 is press fitted onto the head portion 822 of the fixing member 82. Subsequently, the base valve 7 is press fitted into the internal cylindrical surface 823 of the cavity of the fixing member 82. Then, the external cylindrical surface 824 of the fixing member 82 is press fitted into the main tube 3. It should be appreciated that, instead of being coupled to the fixing member 82, according to an embodiment of the present invention, the insert 81 can be directly coupled to the base valve 7 without any direct connection to the main tube 3. In addition, according to an embodiment of the present invention, instead of the fixing member 82, the head portion 822 can extend outward from the base valve 7 for receiving the internal flange 817 of the insert 81.

According to an embodiment of the present invention, the mounting opening 8171 has a diameter Df that is smaller than a diameter Dh of the head portion 822 of the fixing member 82. In particular, a difference between the diameter Df of the mounting opening 8171 and the diameter Dh of the head portion 822 can range from 0.01 to 0.5 mm. Additionally, a height Hf of the internal flange 817 is greater than a height Hh of the head portion 822 wherein a ratio (Hf:Hh) of the height Hf of the internal flange 817 to the height Hh of the head portion 822 can be less than 2. Advantageously, increasing the height Hf of the internal flange 817 relative to the height Hh of the head portion 822 can provide additional sealing between the internal flange 817 and the head portion 822. Between the main and terminal sections 815, 816, an intermediate section 818 can be formed wherein the external diameter of the terminal section 816 gradually increases toward the main section 815.

Furthermore, when assembled, the internal flange 817 provides an additional press fit force against the head portion 822 thereby generating an additional sealing force. During the compression stroke, additional fluid pressure is generated by the additional piston 83 against an internal surface F of the internal flange 817. The additional sealing force improves sealing between an external frontal surface of the internal flange 817 and the cylindrical body 821 of the fixing member 82. Accordingly, to obtain the required leakproofness between the insert 81 and the fixing member 82, it is possible to employ relatively low degree of the interference (tightness) and thereby, greatly reducing a risk of damaging of the head portion 822 during a process of press fitting the insert 81.

In order to obtain an optimized positive impact of the internal flange 817 to the leakproofness between the insert 81 and the head portion 822 and the possible reduction of the degree of the interference (tightness), according to an embodiment of the present invention, the diameter Df of the mounting opening 8171 can satisfy the following:

$$Df \leq \sqrt{Dv^2 - 0.05*[(a*Dm)^2 - (b*Dv)^2]} \tag{1}$$

wherein Df is the diameter of the mounting opening 8171;
Dv is an internal diameter of the insert 81;
Dm is the external diameter of the main section 815 of the insert 81;
a=1.1 to 1.6; and
b=1.0 to 1.5, wherein b*Dv<a*Dm.

According to an embodiment of the present invention, the diameter Df of the mounting opening 8171 can satisfy the following:

$$Df \geq \sqrt{Dd^2 - [(a*Dm)^2 - (b*Dv)^2]} \tag{2}$$

wherein Df is the diameter of the mounting opening 8171;
Dv is an internal diameter of the insert 81;
Dm is the external diameter of the main section 815 of said insert 81;
a=1.1 to 1.6; and
b=1.0 to 1.5, wherein b*Dv<a*Dm.

According to an embodiment of the present invention, an internal diameter Dv of the insert 81 can satisfy the following:

$$Dv \leq \sqrt{\frac{Dd^2 - 0.4*a^2*Dm^2}{1 - 0.4*b^2}} \tag{3}$$

wherein Dv is the internal diameter of the insert 81;
Dd is the external diameter of the terminal section 816;
Dm is the external diameter of the main section 815 of the insert 81;
a=1.1 to 1.6; and
b=1.0 to 1.5, wherein b*Dv<a*Dm.

According to an embodiment of the present invention, the internal diameter Dv of the insert 81 can have a maximum value defined by the following:

$$Dv\max \leq \sqrt{\frac{Dd^2 - 0.4*a^2*Dm^2}{1 - 0.4*b^2}} \tag{4}$$

$$F\max = \frac{\pi}{4} * \left(1 - \frac{Df\min^2}{Dv\max^2}\right) \tag{6}$$

wherein Dvmax is the maximum value of the internal diameter of the insert 81;
Dd is the external diameter of the terminal section 816;
Dm is the external diameter of the main section 815 of the insert 81;
a=1.1 to 1.6; and
b=1.0 to 1.5, wherein b*Dv<a*Dm.

According to an embodiment of the present invention, the diameter Df of the mounting opening 8171 can have a minimal value defined by the following:

$$Df\min = \sqrt{Dd^2 - [(a*Dm)^2 - (b*Dv)^2]} \tag{5}$$

wherein Dfmin is the minimal value of the diameter of the mounting opening 8171;

Dv is an internal diameter of the insert 81;

Dm is the external diameter of the main section 815 of said insert 81;

a=1.1 to 1.6; and b=1.0 to 1.5, wherein b*Dv<a*Dm

According to an embodiment of the present invention, maximal surface area of the internal surface F of the internal flange 817 can be defined by the following to obtain a maximal additional press fit force generated by the flange 817 to improve sealing between the external frontal surface of the flange 817 and the cylindrical body 821 of the fixing member 82:

$$F\max = \frac{\pi}{4} * \left(1 - \frac{Df\min^2}{Dv\min^2}\right) \quad (6)$$

wherein Fmax is the maximal surface area of the internal surface F of the internal flange 817;

Dvmax is the maximum value of the internal diameter of the insert 81; and

Dfmin is the minimal value of the diameter of the mounting opening 8171.

The piston rod 5 includes an extender 51 coupling the additional piston 83 to the piston rod 5. According to an embodiment of the present invention, the additional piston 83 can include a seat 831, a split sealing ring 832, and a nut 833. The split sealing ring 832 has a diameter that correspond to the diameter of the inner chamber 813 of the insert 81. The nut 833 has a torque application hexagonal surface enabling the nut 833 to be fastened on an external thread of a threaded projection 511 of the piston rod extender 51 and thus for coupling all the components of the additional piston 83 to the piston rod 5. With the piston rod extender 51 being coupled to the piston rod 5, the additional piston 83 is axially movable along the center axis A with the main piston 4. It should be appreciated that the external diameter of the additional piston assembly 83 is smaller than the diameter of the main tube 3 enabling for a free flow of working liquid while the additional piston assembly 83 is located within the main tube 3.

The split sealing ring 832 is loosely disposed over the seat 831 between the seat 831 and the nut 833 to define an annular channel extending between the seat 831 and an radially inner surface of the sealing ring 832. The sealing ring 832 provides a sealing while the additional piston 83 moves within the inner chamber 813 of the insert 81 during the compression stroke and the rebound stroke.

It should be appreciated that a decrease of the external diameter Dd of the terminal section 816 of the insert 81 increases the cross-sectional area of the axial annular channel 31 near the axial channels 825 of the fixing member 82 thereby greatly reducing or completely eliminating working liquid flow restrictions for the base valve 7 caused by using an insert 81 having a constant external diameter. The greater is the length Ld of the terminal section 816 with the decreased diameter Dd, the greater is the reduction of working liquid flow restrictions. However, the possible extension of the length Ld of the terminal section 816 is limited by the required insert strength parameters as well as by the required geometry of the grooves 814 (as the grooves 814 extend not only along the whole main section 815 but also partially into the terminal section 816 on the length Lg of the insert 81 with the bottom central lines of the grooves 814 being inclined at the angle α relative to the center axis A of the hydraulic damper assembly 1). Accordingly, according to an embodiment of the present invention, the length Ld of the terminal section 816 of the insert 81 can satisfy the following:

$$Ld \leq \frac{\sqrt{Dd^2 - 0.4 * \left[(a*Dm)^2 - (b*Dv)^2\right]} - Dv}{2 * tg\alpha} + L - Lg \quad (7)$$

wherein L is a length of the insert 81;

Lg is a length of a longest groove 814 of the plurality of grooves 814;

α is an inclination angle of a bottom central line of a groove of the plurality of grooves 814;

Dv is the internal diameter of the insert 81;

Dm is the external diameter of the main section 815 of the insert 81;

Dd is the external diameter of the terminal section 816;

a=1.1 to 1.6; and b=1.0 to 1.5, wherein b*Dv<a*Dm.

FIGS. 6a-6f illustrate a manufacturing process for the insert 81 of the hydraulic compression stop 8. As best illustrated in FIGS. 6a-6f, the manufacturing process is conducted using two broaching dies 93, 94 in cooperation with a calibrating mandrel 91. According to an embodiment of the present invention, the calibrating mandrel 91 has a narrowed end section 911 and a main section 912. A total length of the narrowed end section 911 is at least the required height of the internal flange 817 of the insert 81. In addition, a diameter of the narrowed end section 911 of the calibrating mandrel 91 corresponds to the required diameter Df of the mounting opening 8171 of the internal flange 817. The narrowed end section 911 transforms stepwise into the main section 912 wherein the external shape of the main section 912 corresponds to the required internal shape of the inner chamber 813 of the insert 81. In other words, the main section 912 has a constant diameter that correspond to the internal diameter Dv of inner chamber 813 of the insert 81. On an exterior surface of the main section 912, a plurality of protuberances 913 is formed thereon for forming the plurality of grooves 814 in the inner chamber 813 of the insert 81. The main sections 912 of the calibrating mandrel 91 terminates with a conical section 914 for forming the conical section 811 of the inner chamber 813 of the insert 81.

Figure 6A:
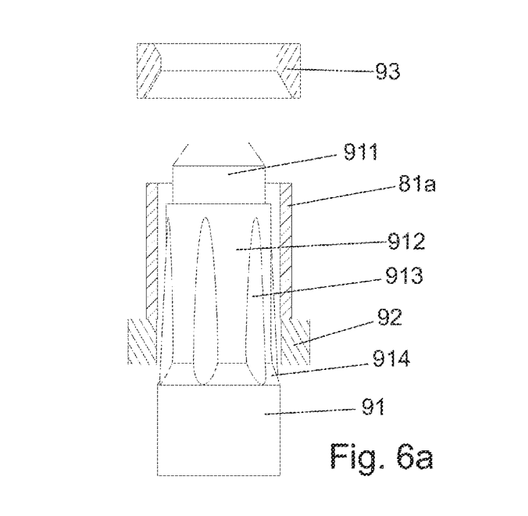
FIG. 6a-6f illustrate a process of manufacturing the insert.
Figure 6B:
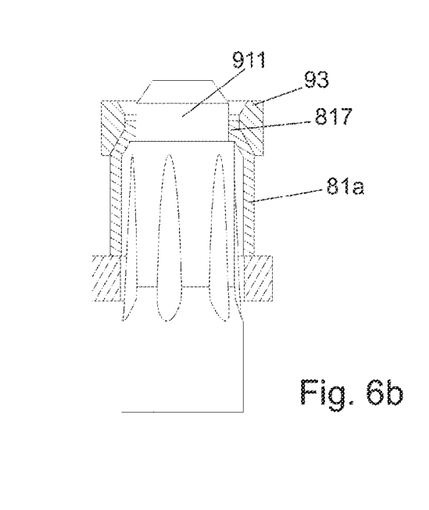
Figure 6C:
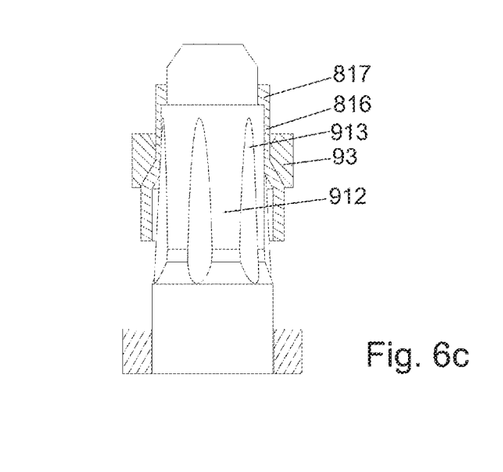
Figure 6D:
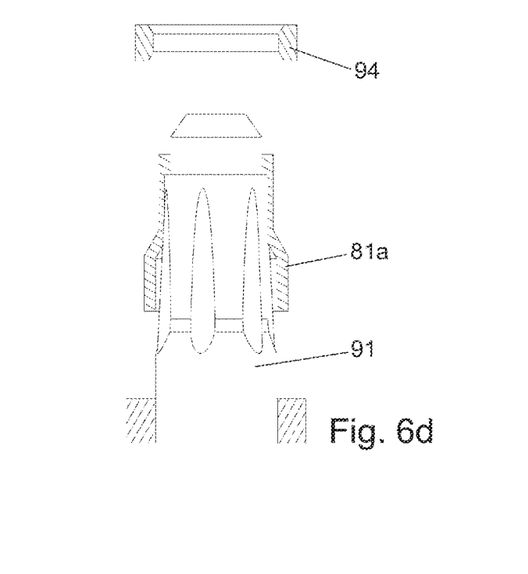

A first broaching die 93, as best shown in FIG. 6a, has a generally cylindrical shape defining a circular broaching shaping aperture. The circular broaching shaping aperture of the first broaching die 93 has a diameter corresponding to the required decreased external diameter Dd of the terminal section 816 of the insert 81. A second broaching die 94, as best shown in FIG. 6d, has a generally cylindrical shape defining a circular broaching shaping aperture. The circular broaching shaping aperture of the second broaching die 94 has a diameter corresponding to the required main external diameter Dm of the main section 815 of the insert 81.

Figure 6E:
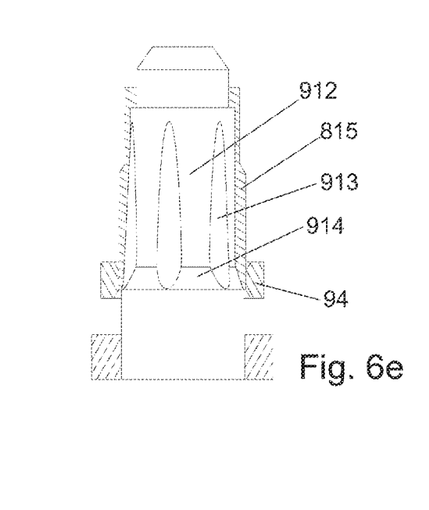
Figure 6F:
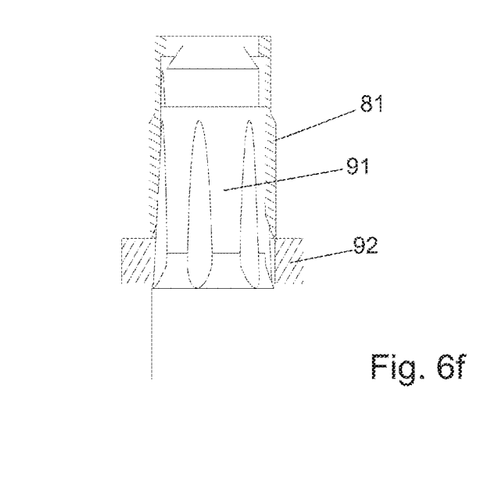

As best illustrated in FIG. 6a, a preformed tube 81a (also referred to as a "blank") is first inserted over the cylindrical calibrating mandrel 91. The preformed tube 81a is supported by a ring 92 extending about the cylindrical calibrating mandrel 91. According to an embodiment of the present invention, the preformed tube 81a can be made of steel (preferably of the following parameters: Rm≥250 Mpa, Re≥195 Mpa, A5≥35%). As best illustrated FIGS. 6b and 6c, the first broaching die 93 is moved axially toward the ring 92 thereby compressing the preformed tube 81a against the cylindrical calibrating mandrel 91 for forming the terminal section 816 having a reduced external diameter. The flange 817 extends about the narrowed end section 911 of the cylindrical calibrating mandrel 91 and the bottom part of the inner housing 813 with lower portions of the grooves 814 being located about the terminal part of the main section 912 of the cylindrical calibrating mandrel 91. During this first broaching operation, a percentage value of a maximal preformed tube cross-sectional area reduction (also referred to as "draft") along the formed the terminal section 816 having the reduced external diameter is at most approximately 0.6. Additionally, it should be appreciated that the draft of the terminal section 816 can be greater than the draft for the flange 817 by at least 0.05. As best illustrated in FIGS. 6d and 6e, the second broaching die 94 is used to form the main section 815 having the main external diameter and the remaining part of the inner chamber surface geometry wherein the remaining parts of the grooves 814 and the conical section 811 are finally shaped to form the insert 81. Accordingly, after the second broaching operation, the cylindrical calibrating mandrel 91 is retracted through the ring 92 as presented in FIG. 6f with the insert 81 resting against the ring 92.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims.

What is claimed is:

1. A hydraulic damper assembly comprising:
a main tube extending along a center axis defining a fluid chamber for containing a working fluid;
an external tube extending about said main tube defining a compensation chamber extending between said main tube and said external tube;
a main piston located in said main tube dividing said fluid chamber into a compression chamber and a rebound chamber;
a piston rod extending into said main tube and coupled to said main piston for moving said main piston between a compression stroke and a rebound stroke;
a base valve located in said compression chamber and coupled to said main tube for controlling working fluid flow between said compression chamber and said compensation chamber; and
a hydraulic compression stop located in said compression chamber for providing an additional damping force during said compression stroke;
said hydraulic compression stop including an additional piston and an insert, said additional piston being coupled to said main piston for movement with said main piston between said compression stroke and said rebound stroke, said insert located in said compression chamber and being coupled to said base valve;
said insert having a main section and a terminal section, said terminal section being located adjacent to a fixing member and said main section being in fluid communication with said terminal section, said terminal section having an external diameter that is less than an external diameter of said main section,
wherein said hydraulic compression stop includes the fixing member, said fixing member located between said main tube and said base valve for coupling said base valve to said main tube; and
wherein said insert couples to said fixing member via a press-fit engagement,
wherein said fixing member includes a head portion extending outwardly from said fixing member and along said center axis toward said main piston,
said terminal section of said insert includes an internal flange extending radially inwardly toward said center axis, said internal flange defining a mounting opening for receiving said head portion to establish said press-fit engagement,
wherein a height of said internal flange is greater than a height of said head portion, a ratio of said height of said internal flange to said height of said head portion is less than 2.

2. The hydraulic damper assembly according to claim 1, wherein said insert and said fixing member are made from metal.

3. The hydraulic damper assembly according to claim 1, wherein said mounting opening has a diameter smaller than a diameter of said head portion, a difference between said diameter of said mounting opening and said diameter of said head portion ranges from 0.01 to 0.5 mm.

4. The hydraulic damper assembly according to claim 1, wherein said head portion has a tensile strength (Rm) greater than or equal to 300 Mpa, a yield stress (Re) greater than or equal to 250 Mpa, and hardness of at least 51 HRB in Rockwell B scale.

5. The hydraulic damper assembly according to claim 1, wherein a diameter of said mounting opening satisfies the following:

$$Df \leq \sqrt{Dv^2 - 0.05*[(a*Dm)^2 - (b*Dv)^2]}$$

wherein Df is said diameter of said mounting opening;
Dv is an internal diameter of said insert;
Dm is said external diameter of said main section of said insert;
a=1.1 to 1.6; and
b=1.0 to 1.5, wherein b*Dv<a*Dm.

6. The hydraulic damper assembly according to claim 1, wherein a diameter of said mounting opening satisfies the following:

$$Df \geq \sqrt{Dd^2 - [(a*Dm)^2 - (b*Dv)^2]}$$

wherein Df is said diameter of said mounting opening;
Dd is said external diameter of said terminal section;
Dm is said external diameter of said main section of said insert;
Dv is an internal diameter of said insert;
a=1.1 to 1.6; and
b=1.0 to 1.5, wherein b*Dv<a*Dm.

7. The hydraulic damper assembly according to claim 1, an internal diameter of said insert satisfies the following:

$$Dv \leq \sqrt{\frac{Dd^2 - 0.4*a^2*Dm^2}{1 - 0.4*b^2}}$$

wherein Dv is said internal diameter of said insert;
Dd is said external diameter of said terminal section;
Dm is said external diameter of said main section of said insert;
a=1.1 to 1.6; and
b=1.0 to 1.5, wherein b*Dv<a*Dm.

8. The hydraulic damper assembly according to claim 1, wherein said insert defines a plurality of grooves, circumferentially spaced from one another, extending toward said base valve; and wherein a length of said terminal section of said insert satisfies the following:

$$Ld \le \frac{\sqrt{Dd^2 - 0.4*[(a*Dm)^2 - (b*Dv)^2]} - Dv}{2*tg\alpha} + L - Lg$$

wherein L is a length of said insert;
Lg is a length of a longest groove of said plurality of grooves;
α is an inclination angle of a bottom central line of a groove of said plurality of grooves;
Dv is an internal diameter of said insert;
Dm is said external diameter of said main section of said insert;
Dd is said external diameter of said terminal section;
a=1.1 to 1.6; and
b=1.0 to 1.5, wherein b*Dv<a*Dm.

9. The hydraulic damper assembly according to claim 1, wherein said fixing member defines a plurality of axial channels, axially spaced apart from one another, extending through said fixing member and in fluid communication with said compression chamber, said base valve, and said compensation chamber.

10. The hydraulic damper assembly according to claim 1, wherein said fixing member defining a cavity located in said compensation chamber and in fluid communication with said compensation chamber, said cavity presenting an internal cylindrical surface for receiving said base valve.

11. The hydraulic damper assembly according to claim 10, wherein said base valve is press-fitted against said internal cylindrical surface of said cavity.

12. A hydraulic damper assembly comprising:
a main tube extending along a center axis defining a fluid chamber for containing a working fluid;
an external tube extending about said main tube defining a compensation chamber extending between said main tube and said external tube;
a main piston located in said main tube dividing said fluid chamber into a compression chamber and a rebound chamber;
a piston rod extending into said main tube and coupled to said main piston for moving said main piston between a compression stroke and a rebound stroke;
a base valve located in said compression chamber and coupled to said main tube for controlling working fluid flow between said compression chamber and said compensation chamber; and
a hydraulic compression stop located in said compression chamber for providing an additional damping force during said compression stroke;
said hydraulic compression stop including an additional piston, an insert, and a fixing member, said additional piston being coupled to said main piston for movement with said main piston between said compression stroke and said rebound stroke, said fixing member located between said main tube and said base valve for coupling said base valve to said main tube, and said insert located in said compression chamber coupled to said fixing member;
said fixing member including a head portion extending outwardly from said fixing member and along said center axis toward said main piston; and
a terminal section of said insert including an internal flange extending radially inwardly toward said center axis, said internal flange defining a mounting opening for receiving said head portion to establish a press-fit engagement,
wherein said insert has a main section and a terminal section, said terminal section being located adjacent to said fixing member and said main section being in fluid communication with said terminal section, and said terminal section having an external diameter that is less than an external diameter of said main section,
wherein a diameter of said mounting opening satisfies the following:

$$Df \le \sqrt{Dv^2 - 0.05*[(a*Dm)^2 - (b*Dv)^2]}, \text{ or}$$

$$Df \ge \sqrt{Dd^2 - [(a*Dm)^2 - (b*Dv)^2]},$$

wherein Df is said diameter of said mounting opening;
Dv is an internal diameter of said insert;
Dm is said external diameter of said main section of said insert;
Dd is said external diameter of said terminal section;
a=1.1 to 1.6; and
b=1.0 to 1.5, wherein b*Dv<a*Dm.

13. The hydraulic damper assembly according to claim 12, an internal diameter of said insert satisfies the following:

$$Dv \le \sqrt{\frac{Dd^2 - 0.4*a^2*Dm^2}{1 - 0.4*b^2}}$$

14. The hydraulic damper assembly according to claim 12, wherein said insert defines a plurality of grooves, circumferentially spaced from one another, extending toward said base valve; and
wherein a length of said terminal section of said insert satisfies the following:

$$Ld \le \frac{\sqrt{Dd^2 - 0.4*[(a*Dm)^2 - (b*Dv)^2]} - Dv}{2*tg\alpha} + L - Lg$$

wherein L is a length of said insert;
Lg is a length of a longest groove of said plurality of grooves;
α is an inclination angle of a bottom central line of a groove of said plurality of grooves.

15. A hydraulic damper assembly comprising:
a main tube extending along a center axis defining a fluid chamber for containing a working fluid;
an external tube extending about said main tube defining a compensation chamber extending between said main tube and said external tube;
a main piston located in said main tube dividing said fluid chamber into a compression chamber and a rebound chamber;
a piston rod extending into said main tube and coupled to said main piston for moving said main piston between a compression stroke and a rebound stroke;
a base valve located in said compression chamber and coupled to said main tube for controlling working fluid flow between said compression chamber and said compensation chamber; and
a hydraulic compression stop located in said compression chamber for providing an additional damping force during said compression stroke;

said hydraulic compression stop including an additional piston and an insert, said additional piston being coupled to said main piston for movement with said main piston between said compression stroke and said rebound stroke, said insert located in said compression chamber and being coupled to said base valve;

said insert having a main section and a terminal section, said terminal section being located adjacent to a fixing member and said main section being in fluid communication with said terminal section, said terminal section having an external diameter that is less than an external diameter of said main section, wherein said hydraulic compression stop includes the fixing member, said fixing member located between said main tube and said base valve for coupling said base valve to said main tube; and wherein said insert couples to said fixing member via a press-fit engagement, wherein said fixing member includes a head portion extending outwardly from said fixing member and along said center axis toward said main piston, said terminal section of said insert includes an internal flange extending radially inwardly toward said center axis, said internal flange defining a mounting opening for receiving said head portion to establish said press-fit engagement, wherein said head portion has a tensile strength (Rm) greater than or equal to 300 Mpa, a yield stress (Re) greater than or equal to 250 Mpa, and hardness of at least 51 HRB in Rockwell B scale.

* * * * *